United States Patent [19]
Churchill

[11] Patent Number: 5,639,122
[45] Date of Patent: Jun. 17, 1997

[54] APPARATUS FOR TRANSPORTING SKIING EQUIPMENT

[76] Inventor: Andrew Philip Churchill, 11 McDonald Dr., Ellon, Aberdeenshire, AB41 3RD, Scotland

[21] Appl. No.: 537,777

[22] PCT Filed: Apr. 7, 1994

[86] PCT No.: PCT/GB94/00743

§ 371 Date: Oct. 10, 1995

§ 102(e) Date: Oct. 10, 1995

[87] PCT Pub. No.: WO94/23809

PCT Pub. Date: Oct. 27, 1995

[30] Foreign Application Priority Data

Apr. 13, 1993 [GB] United Kingdom ............... 9307530

[51] Int. Cl.$^6$ ............................................. A63C 11/00
[52] U.S. Cl. ................................................... 280/814
[58] Field of Search ............................. 280/814, 809, 280/815, 14.1, 47.131, 47.19, 47.26; 211/70.5; 224/917

[56] References Cited

U.S. PATENT DOCUMENTS

| | | | |
|---|---|---|---|
| 3,368,655 | 2/1968 | Purdy | 280/814 |
| 3,767,036 | 10/1973 | McLeod | 280/814 |
| 4,033,460 | 7/1977 | Alexandre | 211/70.5 |
| 4,126,255 | 11/1978 | Olson | 280/814 |
| 4,358,137 | 11/1982 | Gramm | 280/814 |
| 4,856,811 | 8/1989 | Bressler et al. | 280/814 |
| 4,982,883 | 1/1991 | Ullal et al. | 224/917 |
| 5,106,112 | 4/1992 | Sargent | 280/47.19 |
| 5,340,153 | 8/1994 | Parker | 280/814 |

*Primary Examiner*—Richard M. Camby
*Assistant Examiner*—Frank Vanaman
*Attorney, Agent, or Firm*—Gifford, Krass, Groh, Sprinkle, Patmore, Anderson & Citkowski, P.C.

[57] ABSTRACT

Apparatus for transporting skiing equipment comprises a frame, including a clip for holding a pair of skis, pockets for holding a pair of ski boots relative to the skis, and a skid pad; the frame being adapted for location at one end of the pair of skis.

15 Claims, 3 Drawing Sheets

APPARATUS FOR TRANSPORTING SKIING EQUIPMENT

This invention relates to apparatus for use in transporting skiing equipment, and in particular to apparatus to facilitate carrying of skis and ski boots.

In most skiing areas it is necessary, at some point, for skiers to carry their skis and poles. This also requires the skiers to walk in their ski boots which is awkward, due to the rigid construction of the boots, and potentially dangerous due to the absence of proper grips on the soles of the boots and both hands being used to carry the skis and poles. In addition, the wear on the heels and toes of the boots resulting from walking may affect the security of the boots in the ski bindings.

There are also times when the skiers have to carry a set of skis, boots and poles, for example between the hire shop and the chalet. This is extremely difficult with only one pair of hands. Also, in a small ski-chalet the skis, ski boots and ski poles take up a considerable space and if the skis are propped against a wall they may be easily knocked over.

There have been various proposals for apparatus to assist skiers to transport their skis, such as described in DE-8910565.6, FR-A-2595580 and EP-A-0520613. The ski carriers disclosed in these documents are intended to be attached to the end of a pair of skis, and include rollers or skid pads such that the user may drag the skis over the ground, rather than bearing the entire weight of the skis. However, none of the disclosed arrangements make any provision for transporting other ski equipment, such as boots and ski poles.

According to the present invention there is provided an apparatus for transporting skiing equipment consisting of:

(a) a first frame portion for location at one end of a pair of skis defining means for holding the end of a pair of skis, ski boot holding means for receiving one of the heel or toe pieces of a pair of ski boots and ground engaging means;

(b) a second frame portion defining a channel portion for receiving the skis and ski boot holding means for receiving the other of the heel or toe pieces of a pair of ski boots; and (c) means for releaseably retaining the frame portions on a pair of skis.

In use, the invention allows a pair of skis and a pair of ski boots to be held together and easily transported using the ground to support the majority of the weight of the skis and ski boots. Further, when mounted on the apparatus, the ski equipment is relatively compact, thus minimising clutter.

The frame portion may be contained within, or form part of, a bag. In one embodiment the bag may in the form of a substantially rigid case for containing the skis, ski boots and ski poles and being suitable for transporting on aircraft, trains and the like. Alternatively, the bag may be in the form of a small rucksack to be worn by the user when skiing and providing a convenient means for carrying the user's normal shoes, to be worn when the bag is being utilised to carry the skis and ski boots. In a preferred embodiment the frame portion is formed of one or more plastics mouldings.

Preferably, the ski holding means defines a sleeve, clip or pocket for receiving said one end of the skis. Most preferably, one wall of the ski holding means is moveable to facilitate location of the slightly flared ends of the skis therein. The moveable wall may be hingedly mounted and is most preferably mounted via a living hinge. One or more walls of the holding means may include means for gripping the skis, such as a resilient pad. Further, clamp means may be provided for retaining the skis in the holding means, such as a releasable strap.

One or more walls of the channel portion may include means for gripping the skis in the channel portion, such as resilient pads. The second frame portion may also include means for engaging one end of a pair of ski poles. Most preferably, said means are in the form of openings for receiving the points of the ski poles: the other ends of the poles may be held in place by passing the pole straps between the skis.

Preferably also, the ground engaging means is in the form of a skid pad of hard wearing material. Alternatively, a roller or wheels may be provided.

According to another aspect of the present invention there is provided an apparatus for transporting skiing equipment comprising:

a frame portion for location at one end of said pair of skis including: means for holding a pair of skis, means for holding a pair of ski boots relative to said pair of skis, and ground engaging means; and a racksack, the frame portion being contained therein or forming a part thereof, the racksack being adapted to contain the ski boots whilst the apparatus is utilised to transport the skiing equipment, and to be strapped to the back of a user during skiing.

These and other aspects of the present invention will now be described, by way of example, with reference to the accompanying drawings, in which.

Figure 1:
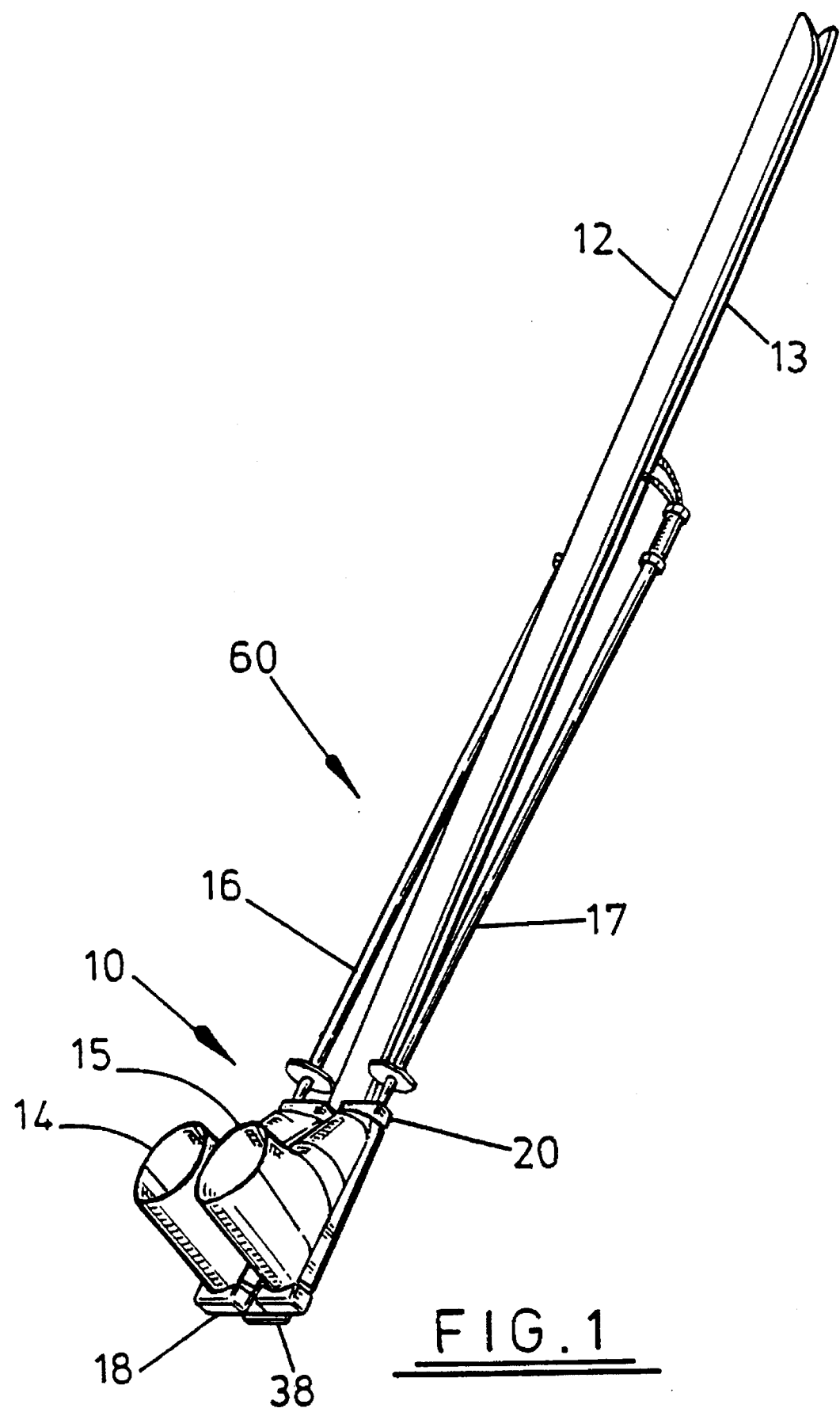
FIG. 1 is a perspective view of apparatus for transporting ski equipment in accordance with a preferred embodiment of the present invention, shown fitted to a pair of skis, a pair of ski boots and a pair of ski poles.
Figure 2:
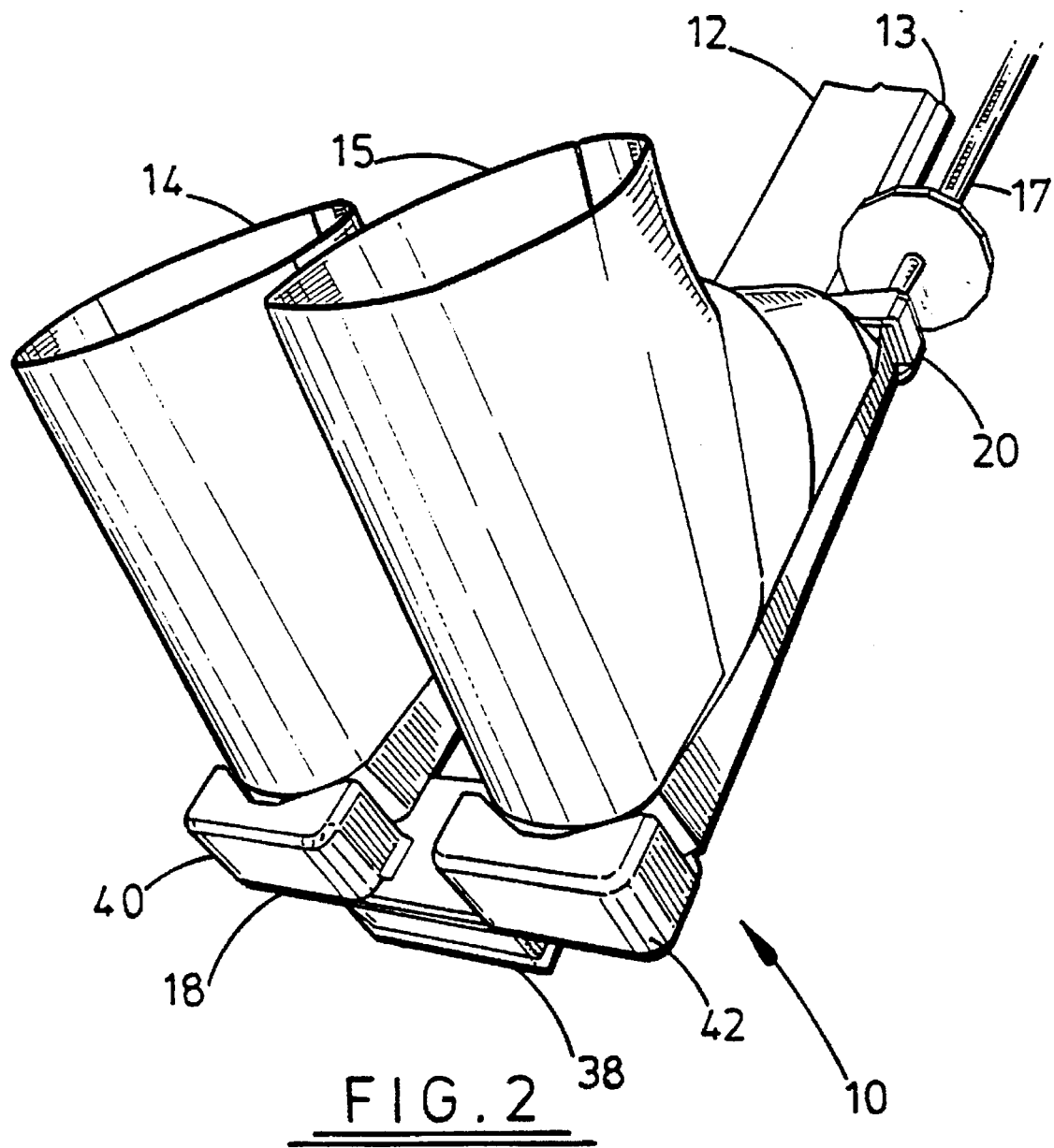
FIG. 2 is an enlarged view of the apparatus of FIG. 1.

Reference is first made to FIGS. 1 and 2 of the drawings, which illustrate apparatus 10 in accordance with a preferred embodiment of the present invention mounted on a pair of skis 12, 13 and supporting a pair of ski boots 14, 15 and a pair of ski poles 16, 17. The apparatus 10 comprises a first or lower frame portion 18 and a second or upper frame portion 20, both frame portions engaging the skis 12, 13 and the heel and toe portions of the boots 14, 15, respectively, the top frame portion 20 also locating the points of the ski poles 16, 17.

Figure 3:
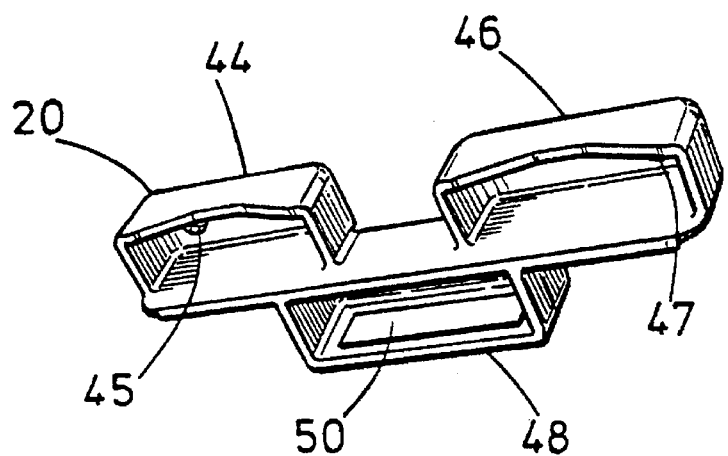
FIG. 3 is an enlarged perspective view from above of the apparatus of FIG. 1, shown separated from the skiing equipment.
Figure 3:
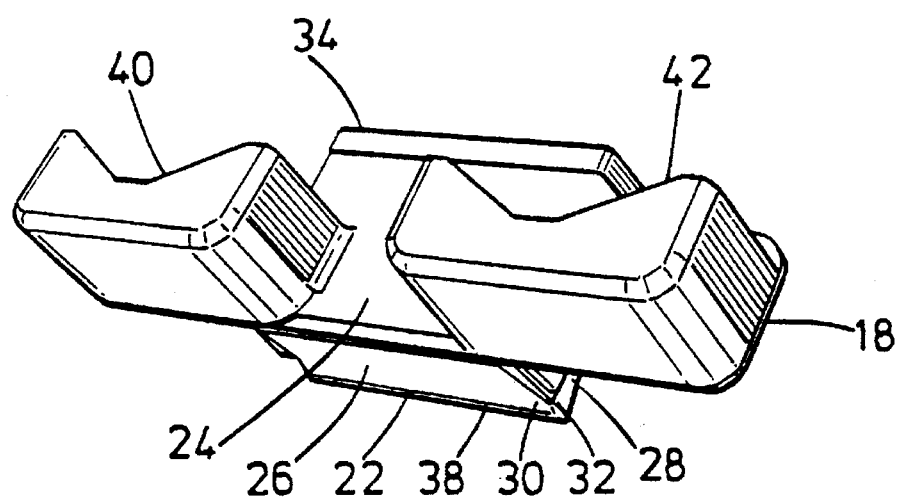

Reference is now also made to FIG. 3 of the drawings, which illustrates the frame portions 18, 20 in more detail. The lower frame portion 18 includes a clip 22 for receiving the ends of the skis and having two fixed walls 24, 26 and a moveable wall 28 connected to the wall 26 via a living hinge 30. Side wall portions 32 (only one visible) are also provided to prevent the skis slipping sideways out of the clip 22. A resilient strap 34 extends around the clip 22 to hold the wall 28 in engagement with the skis and resilient pads (not shown) are provided on the inside wall surfaces to assist in gripping the skis. The lower corner of the clip 38 is thickened to provide a ground engaging portion in the form of a skid pad.

Mounted to the sides of the wall 24 are two generally rectangular pockets 40, 42 for receiving the heel pieces of the ski boots.

The upper frame portion 20 also includes a pair of pockets 44, 46, for receiving the toe pieces of the boots. An aperture 45, 47 is formed in the upper wall of each pocket for receiving the point of a ski pole 16, 17. Each aperture wall is radially slotted such that the point, which is of slightly larger diameter than the aperture will be gripped in the aperture. The pockets 44, 46 are mounted on the upper wall of a channel portion 48 for receiving the skis. Resilient pads 50 are provided on the inside surfaces of the channel portion to facilitate gripping of the skis and to locate the frame portion 20 on the skis.

In this particular example each of the frame portions 18, 20 is formed of a single plastics moulding, such that the portions may be manufactured relatively inexpensively.

In use, the skis 12, 13 are held base-to-base with the tips upwards. The upper frame portion 20 is then slipped over the lower ends of the skis, with the skis in the channel portion 48, and pushed around 30–40 cm up the skis. The ends of the skis 12, 13 are then located in the clip 22 and the strap 34 tightened. The heel pieces of the boots 14, 15 are located in the pockets 40, 42 in the lower frame portion, before the upper frame portion 20 is slid down the skis to locate the toe pieces in the respective pockets 44, 46.

The straps of each ski pole 16, 17 are passed over one of the skis 12, 13 and the points of the poles located in the apertures 45, 47 provided in the walls of the pockets 44, 46.

In this configuration, the skis, ski boots and poles are held together as an easily transportable unit 60, as illustrated in FIG. 1. A user simply grips the skis, or provides a strap to form a handle, and can then pull the unit with the skid pad 38 in contact with the ground.

When not in use, for example when the user is skiing, the apparatus is light and compact enough to be carried in a pocket, pouch or small rucksack.

Other embodiments of the present invention include apparatus in the form of a small rucksack which may include a frame formed of a spine and upper and lower frame portions as described above, and in which the ski boots are contained within the rucksack. While not in use as a skiing equipment carrier the rucksack may be easily carried by the user and provide convenient storage for the user's shoes. In an alternative arrangement, the frame portions may be replaced by a suitable configuration of fabric pockets and sleeves, or a combination of a rigid frame and pockets and sleeves.

The present invention may also be provided in the form of a rigid case, the inside of which is configured to locate the skis, boots and poles in the desired relative positions. The bottom corner of the case is provided with a skid pad or a roller, and a carrying handle is provided on an upper portion of the case.

It will be clear to those of skill in the art that the above-described embodiments are merely exemplary of the present invention and that various modifications and improvements may be made thereto without departing from the scope of the invention.

I claim:

1. Apparatus for transporting skiing equipment including a pair of skis and a pair of ski boots, each ski boot having heel and toe pieces, the apparatus comprising:

(a) a first frame portion for location at one end of a pair of skis defining means for holding the end of a pair of skis, ski boot holding means for receiving one of the heel and toe pieces of a pair of ski boots and ground engaging means;

(b) a second frame portion defining a channel portion for receiving the skis and ski boot holding means for receiving the other of the heel and toe pieces of a pair of ski boots; and (c) means for releasably retaining the frame portions on a pair of skis.

2. The apparatus of claim 1 wherein the frame portions are each a single plastics moulding.

3. The apparatus of claim 1 wherein the ski holding means defines one of a sleeve, clip and pocket.

4. The apparatus of claim 3 wherein one wall of the ski holding means is movable to facilitate location of the ends of the skis therein.

5. The apparatus of claim 4 wherein the movable wall is hingedly mounted.

6. The apparatus of claim 5 wherein the movable wall is mounted via a living hinge.

7. The apparatus of claim 5 wherein clamp means are provided for retaining the skis in the ski holding means.

8. The apparatus of claim 3 wherein one or more walls of the ski holding means and the channel portion includes means for gripping the skis.

9. The apparatus of claim 1 wherein the ski boot holding means define pockets.

10. The apparatus of claim 1 further comprising means for engaging one end of a pair of ski poles, said means being operatively associated with one of the frame portions.

11. The apparatus of claim 10 wherein said ski pole engaging means are openings in the second frame portion for receiving the points of the ski poles.

12. The apparatus of claim 1 wherein the ground engaging means is a skid pad of hard wearing materials.

13. Apparatus for transporting skiing equipment including a pair of skis and a pair of ski boots, each ski boot having heel and toe pieces, the apparatus comprising:

(a) a first frame portion for location at one end of a pair of skis and defining means for holding the end of a pair of skis, ski boot holding means for receiving one of the heel and toe pieces of a pair of ski boots and ground engaging means, the first frame portion being a single plastics molding;

(b) a second frame portion defining a channel portion for receiving the skis and ski boot holding means for receiving the other of the heel and toe pieces of a pair of ski boots, the second frame portion being a single plastics molding; and (c) means for releasably retaining the frame portions on a pair of skis.

14. Apparatus for transporting skiing equipment including a pair of skis and a pair of ski boots, each ski boot having heel and toe pieces, the apparatus comprising:

(a) a first frame portion for location at one end of a pair of skis defining means for holding the end of a pair of skis, ski boot holding means for receiving one of the heel and toe pieces of a pair of ski boots and ground engaging means;

(b) a second frame portion defining a channel portion for receiving the skis, ski boot holding means for receiving the other of the heel and toe pieces of a pair of ski boots and defining openings for receiving ski pole points; and (c) means for releasably retaining the frame portions on a pair of skis.

15. Apparatus for transporting skiing equipment including a pair of skis and a pair of ski boots, each ski boot having heel and toe pieces, the apparatus comprising a frame having first and second separable frame portions, the first frame portion for location at one end of a pair of skis and defining means for holding an end of a pair of skis, ski boot holding means for receiving one of the heel and toe pieces of a pair of ski boots and ground engaging means, and the second frame portion defining a channel portion for receiving the skis and ski boot holding means for receiving the other of the heel and toe pieces of a pair of ski boots.

* * * * *